United States Patent Office 3,041,251
Patented June 26, 1962

3,041,251
PROCESS FOR THE PURIFICATION OF MALEIC ANHYDRIDE
Pietro Perfetti, Milan, and Ettore Guidi, Rho-Milan, Italy, assignors to Montecatini Società Generale per l'Industria Mineraria e Chimica, Milan, Italy, a corporation of Italy
No Drawing. Filed June 24, 1959, Ser. No. 822,454
Claims priority, application Italy June 27, 1958
9 Claims. (Cl. 202—59)

The present invention relates to the purification of maleic anhydride. It particularly pertains to a process for purifying and refining maleic anhydride produced by catalytic oxidation, in the vapor phase, of benzene, butene, crotonaldehyde, and other organic substances.

The maleic anhydride contained in the hot reaction gases is commercially recovered by well known processes. Among the latter are the following: partial direct condensation under controlled conditions of concentration and temperature, absorption in suitable organic solvents, and washing with water with subsequent dehydration of the maleic acid.

When so recovered from the reaction gases the maleic anhydride is impure. It contains coloring substances and, generally, maleic acid.

The product in such condition is called raw maleic anhydride. The coloring substances, not having a well defined chemical constitution, are called chromogenic substances. These substances have the same volatility as maleic anhydride, and therefore cannot be completely separated from the useful product by rectification.

The purified maleic anhydride, if it is to be used in the preparation of resins for varnishes and polyesters, should have a white color, which does not change in the course of time, particularly upon exposure to light and upon heating. The colorimetric scale universally adopted by manufacturers for determining the color of maleic anhydride is the APHA scale.

A principal object of the present invention is to provide a quick and simple process for purifying and refining the raw maleic anhydride. By this process the raw anhydride, containing a high amount of chromogenic substances and maleic acid, is stably decolorized and refined, while also achieving the dehydration of the maleic acid to maleic anhydride, with high yields.

The raw maleic anhydride, in the liquid phase at 55–65° C., is contacted with crystalline sodium perborate, $NaBO_3.4H_2O$, which is dispersed in the liquid anhydride by agitation. The mass is kept agitated at 60–70° C. for half an hour; the temperature is then raised and the rectification of the anhydride is then started by operating with a temperature of 90–140° C. in the boiler, under a residual head pressure of 20–60 mm. Hg (absolute).

The vapors are condensed at 54 to 70° C. in the top of the rectification column, and the whole is refluxed for 30 to 60 minutes. Thereafter the withdrawal of the purified maleic anhydride, having a low color number stable in time, is started. The distillation is continued until the reboiler is dry. The minimum amount of $NaBO_3.4H_2O$ to be used can vary preferably from 0.10 to 1.50% by weight in respect of the treated raw product, depending on the more or less intensive color of the raw maleic anhydride, with a maximum amount of 5% by weight.

Sodium perborate, which at 60° C. already releases atomic oxygen, displays its activity upon the chromogenic substances by transforming them into substances having a lower volatility than maleic anhydride, which can therefore be separated from the impurities, by the subsequent rectification.

We have also found that, when the purification is carried out under the aforementioned conditions, most of the maleic acid, present in the raw maleic anhydride in amounts varying from 0.% to 35% by weight, is dehydrated to maleic anhydride.

The yields of purified maleic anhydride obtainable by the purification and refining process are higher than 98% in respect to the content of maleic anhydride and maleic acid, the latter expressed as anhydride, present in the treated raw product.

This dehydration of maleic acid to maleic anhydride, with the high yields obtainable by our process, can take place by operating at a temperature not higher than 140° C., since in this way the thermal isomerization of maleic acid to fumaric acid is avoided. Fumaric acid cannot, practically or economically, be transformed into maleic anhydride, and is a solid.

The dehydration of maleic acid to maleic anhydride, with the high yields attainable through our process, is now made actually possible through use of sodium perborate, because the latter displays its purifying activity at low temperature. This makes it possible to avoid the transformation of maleic acid in the raw product into fumaric acid.

The following examples are illustrative and are not intended to limit the scope of our invention. The parts are expressed by weight.

*Example 1*

1500 parts of raw maleic anhydride are used. The raw anhydride is obtained by partial, uncontrolled condensation of reaction gases obtained by catalytic oxidation of benzene. It consists of 1226 parts maleic anhydride, 266 parts maleic acid, the remaining 8 parts being unidentified substances. The raw anhydride has a very intensive brown-maroon color. In the liquid state its color number is much higher than 500° APHA.

This raw anhydride is charged into an autoclave for the chemical treatment, and while it is in the liquid state at a temperature of 60° C., 15 parts of $NaBO_3.4H_2O$ are added, the mixture being agitated for half an hour under an absolute pressure of 30 mm. Hg.

At the end of the chemical treatment, and while maintaining said pressure the temperature of the treated anhydride is raised to 120° C. Rectification under total reflux is then started, and is continued for one hour.

The condensation of the distilled vapors is carried out at 56° C.

The distillate is then tapped with a maximum reflux ratio of 0.5, the operation being carried on until the reboiler is dry. In the upper portion of the rectification column there are 1415 parts purified maleic anhydride having an acidity, as anhydride, of 99.9%, whereas after the condenser of maleic anhydride 40 parts of an aqueous solution containing 6 parts maleic acid are collected.

In the reboiler there remains a deeply colored residue containing 25 parts maleic acid; this residue is easily discharged by washing with water.

All of the purified anhydride thus collected has a color of 10° APHA in the molten state. After exposure to sunlight for 120 days its color turns to 30° APHA.

*Example 2*

300 parts of raw maleic anhydride are used, as obtained by the absorbing, and subsequent rectification, of the reaction gases, obtained by oxidation of benzene in dibutyl phthalate. It consists of 294 parts maleic anhydride and 5 parts maleic acid, the remainder being non-identified substances. The color of this raw product is much higher than 500° APHA.

The raw product is treated with 4.5 parts of
$NaBO_3.4H_2O$ at 65° C. for a half hour, with a residual pressure of 40 mm. Hg, absolute.

The rectification is carried out by keeping the reboiler at a temperature of 130° C. with a residual pressure of 40 mm. Hg absolute. The condensation of the vapors is effected at 56° C.

295 parts of purified maleic anhydride having an acidity of 99.9%, as anhydride, are collected in the head of the rectification column, whereas after the condenser for maleic anhydride 1 part of an aqueous solution containing 0.5 part maleic acid is collected. In the reboiler there remains a residue containing 3 parts of maleic acid.

The purified maleic anhydride has a color number of 20° APHA and after exposure to sunlight for 60 days its color turns to 50° APHA.

We claim:

1. A process for purifying maleic anhydride mixtures containing chromogenic impurities and maleic acid, and for dehydrating the maleic acid to maleic anhydride, comprising heating the molten anhydride mixture at a temperature not higher than 140° C. with sodium perborate, and distilling off the purified maleic anhydride under sub-atmospheric pressure at a temperature not higher than 140° C.

2. A process for purifying maleic anhydride comprising treating the molten anhydride with sodium perborate and thereafter distilling off the purified maleic anhydride under sub-atmospheric pressure, the sodium perborate being employed in an amount not more than about 5% by weight of the maleic anhydride being treated, said treating and distilling being at temperatures not higher than 140° C.

3. A process for purifying maleic anhydride mixtures containing chromogenic impurities and maleic acid, and for dehydrating the maleic acid to maleic anhydride, comprising heating the molten anhydride mixture at a temperature not higher than 140° C. with sodium perborate, and distilling off the purified maleic anhydride under sub-atmospheric pressure at a temperature not higher than 140° C., the sodium perborate being employed in an amount from about 0.10 to 1.5% by weight of the treated maleic anhydride.

4. A process for purifying maleic anhydride mixtures containing chromogenic impurities and maleic acid, and for dehydrating the maleic acid to maleic anhydride, comprising heating the molten anhydride mixture with sodium perborate, and distilling off the purified maleic anhydride under sub-atmospheric pressure at a temperature not higher than 140° C., the sodium perborate being employed in an amount from about 0.10 to 1.5% by weight of the treated maleic anhydride, the heating with the perborate being carried out at 55° to 140° for not more than about two hours, prior to said distilling off of the purified anhydride.

5. A process for purifying raw maleic anhydride colored by chromogenic impurities which cannot be separated by distillation, and containing also maleic acid, and for dehydrating the maleic acid to maleic anhydride, characterized in that the raw anhydride in the molten state is treated with minor amounts by weight of sodium perborate and the treated raw product is then distilled under vacuum, said distillation and said treatment being carried out at temperatures not higher than 140° C.

6. A process according to claim 5, characterized in that the amount of sodium perborate is from 0.10% to 1.5% by weight of the treated raw anhydride and that the treatment is carried out at between 60° C. and 140° C. for a time not more than 2 hours.

7. A process for purifying impure maleic anhydride mixtures containing chromogenic impurities and maleic acid, and for dehydrating the maleic acid to maleic anhydride, the source of the maleic anhydride being the reaction gases resulting from catalytic oxidation of organic compounds, the maleic acid therein being converted by said process to maleic anhydride while minimizing formation of fumaric acid, said process comprising treating the impure molten maleic anhydride mixture with sodium perborate dispersed therein, at about 55° to 65° C., then refluxing the anhydride by heating it to 90° to 140° C. while condensing vapors so produced at 54° to 70° C., and thereafter distilling off under vacuum the purified maleic anhydride from the impure residue, at a temperature not higher than 140° C.

8. A process for purifying impure maleic anhydride mixtures containing chromogenic impurities and maleic acid, and for dehydrating the maleic acid to maleic anhydride, the source of the maleic anhydride being the reaction gases resulting from the catalytic vapor phase oxidation of organic compounds, the process resulting in transforming the anhydride into purified maleic anhydride having a purity greater than 99.5% and a color number of 10–20 APHA in the molten state, the yields of purified maleic anhydride being greater than 95 weight percent of the content of maleic anhydride and maleic acid, expressed as anhydride, present in the treated impure anhydride, said process comprising heating the impure molten maleic anhydride mixture with sodium perborate disposed therein at about 55° to 65° C., then refluxing the anhydride by heating it at about 90° to 140° C. while condensing vapors so produced at about 54° to 70° C., and thereafter distilling off the purified maleic anhydride from the impure residue at a temperature not higher than 140° C., said purification process and said distillation being carried out at an absolute pressure of about 20 to 60 mm. of mercury.

9. The process of claim 3, the perborate being $$NaBO_3 \cdot 4H_2O$$

References Cited in the file of this patent

UNITED STATES PATENTS

| | | |
|---|---|---|
| 2,296,218 | Middleton | Sept. 15, 1942 |
| 2,308,588 | Crowell | Jan. 19, 1943 |
| 2,671,054 | Bump et al. | Mar. 2, 1954 |
| 2,708,653 | Sisco et al. | May 17, 1955 |
| 2,806,861 | Cummings | Sept. 17, 1957 |
| 2,809,926 | Shrader et al. | Oct. 15, 1957 |
| 2,850,440 | Shrader et al. | Sept. 2, 1958 |